US009652168B2

(12) United States Patent
Bhattacharjee et al.

(10) Patent No.: US 9,652,168 B2
(45) Date of Patent: *May 16, 2017

(54) ADAPTIVE CONCURRENCY CONTROL USING HARDWARE TRANSACTIONAL MEMORY AND LOCKING MECHANISM

(71) Applicant: International Business Machines Corporation, Armonk, NY (US)

(72) Inventors: Bishwaranjan Bhattacharjee, Yorktown Heights, NY (US); Mustafa Canim, Ossining, NY (US); Yuan-Chi Chang, Armonk, NY (US); Mohammad Sadoghi Hamedani, Chappaqua, NY (US); Bassem Makni, Troy, NY (US); Kenneth Andrew Ross, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/683,928

(22) Filed: Apr. 10, 2015

(65) Prior Publication Data

US 2016/0299718 A1   Oct. 13, 2016

(51) Int. Cl.
*G06F 3/06* (2006.01)
*G06F 9/46* (2006.01)
(Continued)

(52) U.S. Cl.
CPC .......... *G06F 3/0622* (2013.01); *G06F 3/0637* (2013.01); *G06F 3/0659* (2013.01); *G06F 3/0673* (2013.01); *G06F 9/467* (2013.01); *G06F 9/528* (2013.01); *G06F 12/1466* (2013.01); *G06F 2212/1052* (2013.01)

(58) Field of Classification Search
CPC ........ G06F 9/467; G06F 9/528; G06F 9/4881; G06F 9/468; G06F 9/4843; G06F 9/5022; G06F 3/0622; G06F 3/0659; G06F 2212/1052; G06F 3/0637; G06F 3/0673; G06F 12/1466
See application file for complete search history.

(56) References Cited

U.S. PATENT DOCUMENTS 6,826,570 B1   11/2004   Eshel et al.
7,882,087 B2   2/2011   Johnson
(Continued)

OTHER PUBLICATIONS

Michael James Cahill, "Serializable Isolation for Snapshot Databases," ACM Transactions on Database Systems (TODS), Article No. 20, Dec. 2009, 42 pages, vol. 34, No. 4.
(Continued)

*Primary Examiner* — Hashem Farrokh
(74) *Attorney, Agent, or Firm* — Alexa L. Ashworth; Ryan, Mason & Lewis, LLP

(57) ABSTRACT

A method includes the following steps. Runtime statistics related to data transaction processing in a concurrent system are collected. A given request to access shared data in the concurrent system is receive. Based on the collected runtime statistics, the number of reattempts the given request can make to access the shared data prior to access control being switched from a hardware transactional memory to a locking mechanism is adaptively determined.

20 Claims, 7 Drawing Sheets

(51) Int. Cl.
*G06F 9/52* (2006.01)
*G06F 12/14* (2006.01)

(56) References Cited

U.S. PATENT DOCUMENTS

| | | | | |
|---|---|---|---|---|
| 2007/0233970 | A1* | 10/2007 | Saha | G06F 9/526 711/152 |
| 2009/0070879 | A1* | 3/2009 | Saika | G06F 21/566 726/24 |
| 2010/0138571 | A1* | 6/2010 | Cain, III | G06F 9/467 710/56 |
| 2010/0169579 | A1* | 7/2010 | Sheaffer | G06F 12/084 711/141 |
| 2010/0169618 | A1 | 7/2010 | Ramalingam et al. | |
| 2013/0262424 | A1* | 10/2013 | Cain, III | G06F 17/30351 707/703 |
| 2014/0040567 | A1* | 2/2014 | Pohlack | G06F 12/1027 711/152 |
| 2015/0026688 | A1* | 1/2015 | Dice | G06F 9/467 718/102 |

OTHER PUBLICATIONS

C. Mohan et al., "ARIES: A Transaction Recovery Method Supporting Fine Granularity Locking and Partial Rollbacks Using Write-Ahead Logging," ACM Transactions on Database Systems (TODS), Mar. 1992, pp. 94-162, vol. 17, No. 1.

P.-Å. Larson et al., "High-Performance Concurrency Control Mechanisms for Main-Memory Databases," Proceedings of the VLDB Endowment, Aug. 2012, pp. 298-309, vol. 5, No. 4, Istanbul, Turkey.

Michael James Cahill, "Serializable Isolation for Snapshot Databases," The University of Sydney, School of Information Technologies, Thesis, Aug. 2009, 135 pages.

U.S. Appl. No. 14/623,656, filed Feb. 17, 2015 and entitled "Accelerating Multiversion Concurrency Control Using Hardware Transactional Memory."

* cited by examiner

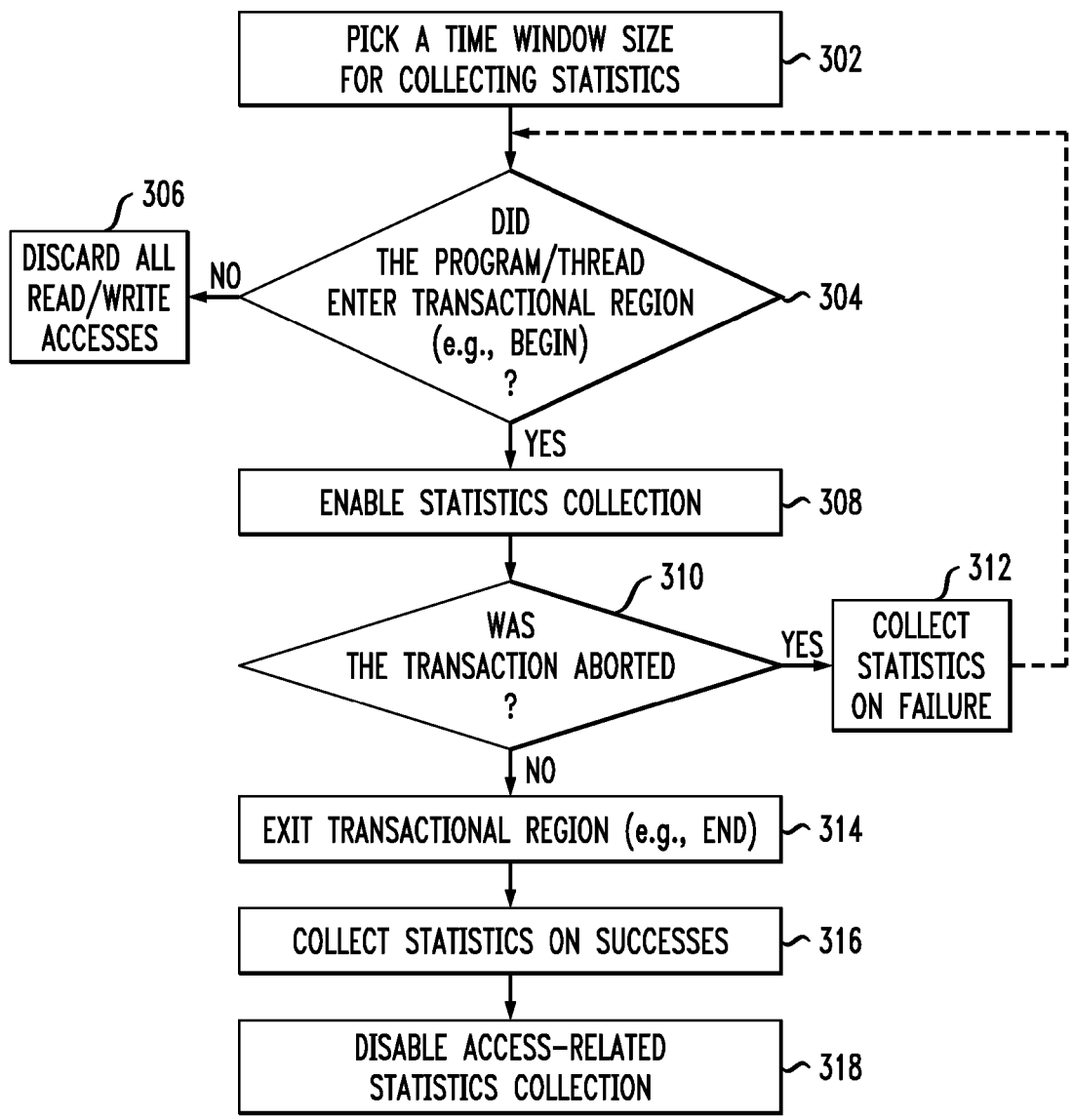

ADAPTIVE CONCURRENCY CONTROL USING HARDWARE TRANSACTIONAL MEMORY AND LOCKING MECHANISM

FIELD

The present application generally relates to concurrency control and, more particularly, to techniques providing adaptive concurrency control using hardware transactional memory and locking mechanisms.

BACKGROUND

Concurrent computing is a form of computing in which several computations are executed during overlapping time periods, i.e., concurrently, rather than sequentially (one completing before the next one starts). Thus, concurrent computing can be considered a property of a system (the system can be, for example, a hardware processor, a software program, a computer, or a network) whereby there is a separate execution point or "thread" of control for each computation (process). Thus, a concurrent system is one where a computation can make progress without waiting for all other computations to complete, i.e., where more than one computation can make progress at the same time.

A main challenge in designing concurrent systems is the concept of concurrency control. Concurrency control in a concurrent system ensures the correct sequencing of the interactions or communications between different computational executions, and coordinates access to resources that are shared among executions.

One approach to concurrency control utilizes a locking mechanism (one or more locks) to guarantee that threads have exclusive access to shared data for a critical section of code execution. Typically, a thread acquires the lock, executes its critical section of code, and releases the lock. This approach is considered a pessimistic concurrency control approach.

A more recent approach to concurrency control in the context of multi-threaded, multi-core hardware processors is the use of a "hardware transactional memory." Hardware transactional memory attempts to simplify concurrent programming by allowing a group of load and store instructions to execute in an atomic way (i.e., guarantee of isolation from concurrent processes). This approach is considered an optimistic concurrency control approach.

SUMMARY

Embodiments of the invention provide adaptive concurrency control using hardware transactional memory and locking mechanisms.

For example, one embodiment comprises the following steps. Runtime statistics related to data transaction processing in a concurrent system are collected. A given request to access shared data in the concurrent system is received. Based on the collected runtime statistics, the number of reattempts the given request can make to access the shared data prior to access control being switched from a hardware transactional memory to a locking mechanism is adaptively determined.

Advantageously, illustrative embodiments of the invention adapt and/or instruct a concurrency control protocol when and how to use hardware transactional memory and when to fall back to a locking mechanism. Adaptive concurrency control according to illustrative embodiments improves the performance of data transaction processing in a concurrent system.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 3 shows a process for collecting runtime-statistics, according to an embodiment of the invention.

DETAILED DESCRIPTION

Figure 1A:
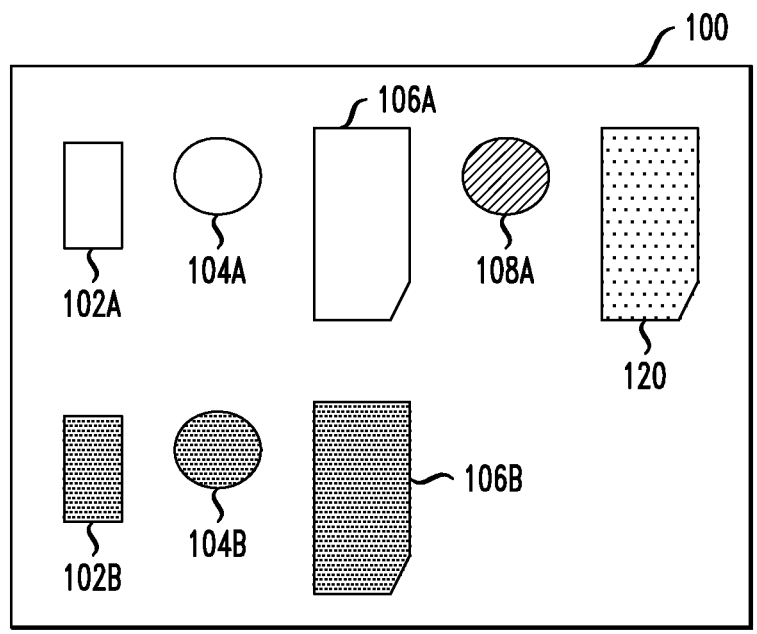
FIGS. 1A and 1B show transactional memory usage, according to an embodiment of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

Hardware transactional memory (HTM) provides access to shared resources with transactional properties. Exemplary implementations of HTM include IBM BlueGene, IBM zProcessor (main frame), IBM Power processors and Intel® Transactional Synchronization Extensions (TSX). HTM is based on optimistic concurrency control in which transactions access the shared resources (read/write) without acquiring any locks. Therefore, HTM is responsible for detecting conflicts among concurrent readers and writers of shared resources and abort affected transactions. The aborted transaction may choose to reattempt a number of times by re-executing the transaction including re-reading/re-writing of shared resources. However, due to the optimistic nature of HTM, the reattempts may fail infinitely; therefore, every transaction must provide a fallback routine that is based on traditional software locking mechanism. Consequently, a transaction will automatically switch from hardware transactional memory to software locking method after trying a fixed number of reattempts provided as a parameter by the user (e.g., programmer).

For example, in current programming using TSX, the limit of Transaction Begin (XBEGIN) reattempts affect the code performance dramatically. When writing a TSX based code, the developer typically writes a fallback mechanism, which uses a traditional lock that executes after a certain number of aborts of the transaction. In existing TSX based code, this number is prefixed, for example, GNU Compiler Collection 4.8 uses a limit of 3, after which a locking mechanism is implemented. As the appropriate number of reattempts depend on many parameters, such as contention level and system load, a prefixed limit number will perform well only in certain scenarios but not in all scenarios.

Illustrative embodiments of the invention provide a learning approach where the system finds the best number of reattempts by keeping track of previous successful commits and the reasons for aborts. An abort that is caused by internal buffer overflow (e.g., TSX abort code 3), for example, is likely to abort even when retried. A transaction that is going to use a lot of memory will be aborted anyway due to the limit of transactional memory, so it is more efficient to directly use the locking mechanism rather than wasting time on unsuccessful commits. Furthermore, illustrative embodiments of the invention predict memory that will be used by the transaction before submitting an XBEGIN, and decide if it is worthwhile to use transactional memory. Still further, illustrative embodiments of the invention provide for selectively holding locks in HTM mode for frequently accessed and/or modified shared data.

Illustrative embodiments of the invention provide an adaptive mechanism to dynamically tune the number of reattempts based on: (1) collected runtime statistics (e.g., collecting read/write ratio and the frequency of transaction success/failure in a given time-window); and (2) exploiting eager-locking mechanism to protect "hot" shared resources and avoid frequent aborts and reattempts. "Hot" resources, as used herein, refer to data records that will likely be updated or is frequently updated (the specific frequency is application-dependent and can be set as a system parameter). While illustrative embodiments of the invention are directed to shared data and/or shared data records, shared resources may include shared programs, devices, etc. As used herein, the terms "transaction" and "request" are used interchangeably, and the term "workload" refers to one or more transactions/requests. Although transactions may be supported with hardware, software, microcode or any combination of the above to implement data isolation, exemplary embodiments of the invention described herein use hardware transactional memory.

Figure 1B:
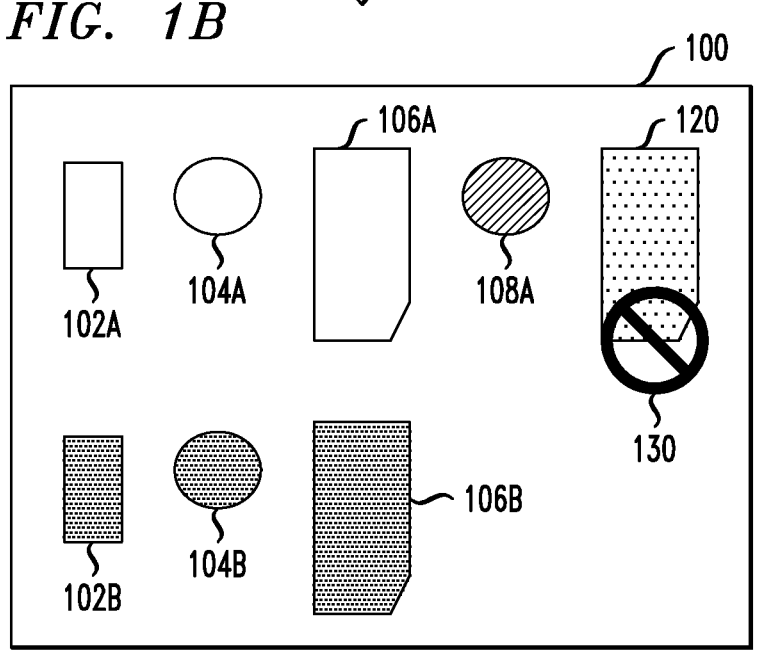

FIGS. 1A and 1B depict transactional memory usage in accordance with an embodiment of the invention. As shown in FIGS. 1A and 1B, HTM 100 includes logical identifier (LID) 102A and committed record identifier (cRID) 104A associated with data record 106A. HTM 100 also includes LID 102B and cRID 104B associated with data record 106B. A transaction then modifies data record 106A, this modification is then saved as uncommitted record identifier (uRID) 108A and data record 120. FIG. 1B further depicts a scenario in which hot resources may be selectively locked according to an embodiment of the invention. Assuming that data record 120 is a hot record because it will likely be updated or is frequently updated, data record 120 will be locked 130 in HTM mode. Data records 106A, 106B and 120, LIDs 102A and 102B, cRIDs 104A and 104B, and uRID 108A may be stored, for example, on a computer readable storage medium and/or a RAM of FIG. 9. An illustrative embodiment of a transactional memory system that may include HTM 100 is described below in the context of FIG. 10.

Figure 2A:
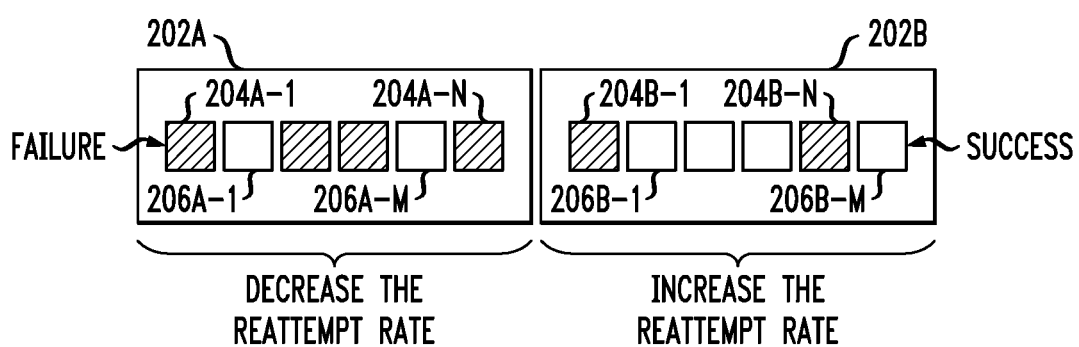
FIGS. 2A and 2B show runtime-statistics of frequency of success/failure and read/write ratio in a given window, respectively, according to embodiments of the invention.
Figure 2B:
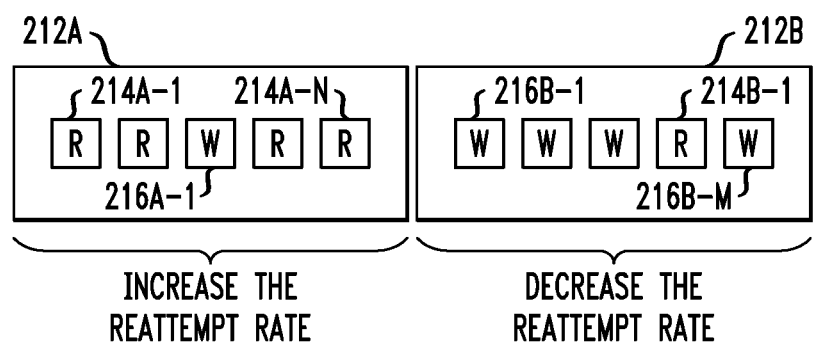

FIGS. 2A and 2B show collected runtime-statistics in a given window according to an embodiment of the invention. Collection of runtime-statistics is described below in the context of FIG. 3. As shown, FIG. 2A depicts runtime-statistics of the frequency of success/failure in given time windows 202A and 202B. A given time window may have one or more failed reattempts, represented by box 204A-1 . . . 204A-N and 204B-1 . . . 204B-N, and one or more successful reattempts, represented by 206A-1 . . . 206A-M and 206B-1 . . . 206B-M, where N and M are integers. In the instance where there are more failed reattempts (e.g., the ratio of failure is greater than the ratio of success, or where N is greater than M), as shown in time window 202A, embodiments of the invention would seek to decrease the reattempt rate. In contrast, time window 202B shows the instance where there are more successful reattempts (e.g., the ratio of success is greater than the ratio of failure, or where M is greater than or equal to N), embodiments of the invention seek to increase the reattempt rate. Thus allowing for an adaptive mechanism to dynamically adjust the reattempt rate based on collected runtime statistics.

FIG. 2B depicts run-time statistics of read/write accesses in given windows 212A and 212B. A given time window may have one or more read accesses, represented as boxes 214A-1 . . . 214A-N and 214B-1, and one or more write accesses, represented as boxes 216A-1 and 216B-1 . . . 216B-M, where M and N are integers. In the instance where there are more read accesses (e.g., the ratio of reads is greater than the ratio of writes, or where N is greater than M), as shown in time window 212A, embodiments of the invention seek to increase the reattempt rate. In contrast, in the instance where there are more write accesses (e.g., the ratio of writes is greater than the ratio of reads, or where M is greater than or equal to N), as shown in time window 212B, embodiments of the invention seek to decrease the reattempt rate.

FIG. 3 shows a runtime-statistics collection process 300, according to an embodiment of the invention. At step 302, a time window size is selected for statistics collection. The time window itself may be adjusted and tuned based on the effectiveness of and expected fluctuation in the workloads. This adjustment may be performed manually by a user or automatically by a program based on a pre-defined criteria or threshold. Typically, the transactionally protected region is identified by a BEGIN and an END clause. Any data accesses within these transactional regions are protected, thus avoiding concurrent read and write conflicts. At step 304, the process determines whether or not the program/thread entered the transactional region (e.g., BEGIN). Notably, a program/thread could enter or exit the transactional region multiple times. If it is determined that the program/thread did not enter the transactional region, the all read/write accesses are discarded at step 306. If it is determined that the program/thread entered the transactional region, then statistics collection is enabled at step 308. Details relating to the statistics collected and maintained are further delineated in FIG. 4 below. Referring back to FIG. 3, at step 310, a determination is made as to whether or not a transaction was aborted (e.g., due to conflict, exceeding transaction memory footprint, and/or etc.). If the transaction was aborted, then at step 312, statistics relating to the transaction's failure and the number of reattempts are collected, and based on the collected statistics, decide whether to reattempt (i.e., return to step 304) or fallback to locking. However, if the transaction was not aborted, then at step 314, once the program/thread exits the transactional region (e.g., END), statistics relating to the transaction's successes (whether success was achieved by HTM or locking) are collected at step 316. Then at step 318, access-related statistics collections are disabled.

Figure 4:
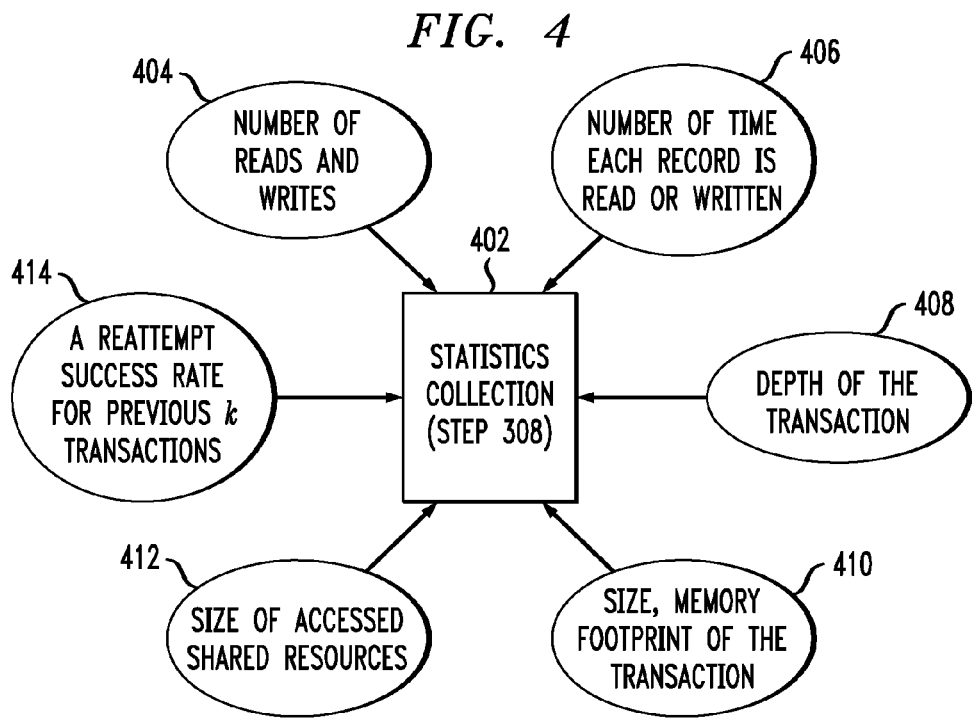
FIG. 4 shows statistics collected in the statistics collection step of FIG. 3.

FIG. 4 delineates the statistics collection step 308 of FIG. 3 described above. Once statistics collection is enabled at step 402 (e.g., step 308 in FIG. 3), the following statistics are collected:

404: the number of reads and writes (to determine whether the workload is mostly read or mostly write);

406: the number of time each record is read or written to (to identify the hotness of a record);

408: the depth of the transaction (e.g., the number of operations), because as the depth of transaction increases, the likelihood of conflict also increases. For example, as the number of operations within a transaction increases, the likelihood that the HTM optimistic approach fails increases, and the number of re-attempts could be decreased;

410: the size of the transaction, the memory footprint of the transaction;

412: the size of the accessed shared resources; and

414: a reattempt success rate for the previous k transactions, where k is an integer.

Illustrative embodiments of the invention may also maintain a success-on-abort sliding window and/or scale to adjust the number of reattempts for a given request (e.g., based on the reattempt success rate for the previous k transactions).

Figure 5:
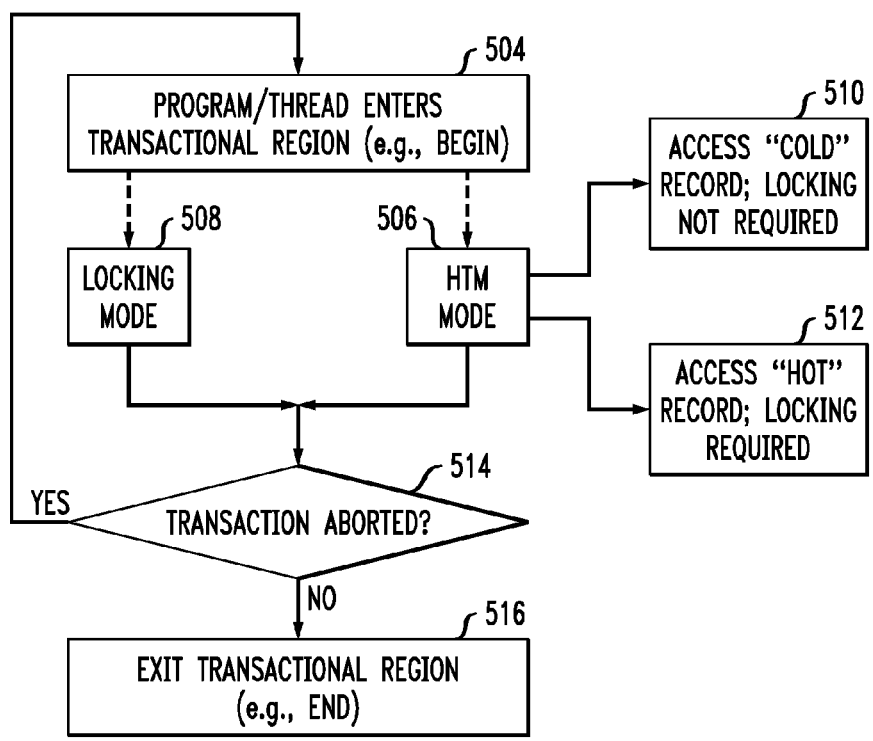
FIG. 5 shows a process for executing a transaction, according to an embodiment of the invention.

FIG. 5 illustrates an exemplary process 500 for executing a transaction according to an embodiment of the invention. At step 504, when a program/thread enters transactional region (e.g., BEGIN), determine whether to enter HTM mode (step 506) or locking mode (step 508) based on the collected statistics. As previously noted, a program/thread could enter/exit the transactional region multiple times. Factors that lead to entering HTM mode are described in the context of FIG. 6 below, and factors that lead to entering locking mode are delineated in the context of FIG. 7 below. After entering HTM mode at step 506, if a cold record (e.g., a record that would not likely be updated or updated frequently) is accessed at step 510, locks are not required for this step; if a hot record is accessed at step 512, locking may be required. The types of locking that may be required when a hot record is accessed in HTM mode are further discussed in the context of FIG. 8 below. Referring back to FIG. 5, at step 514, after entering HTM mode at step 506 and locking mode at step 508, a determination is made as to whether or not the transaction was aborted. If the transaction was aborted, then the process 500 returns to step 504; if the transaction was not aborted, then the transaction successfully completes and commits, and exits the transactional region (e.g., END) at step 516.

Figure 6:
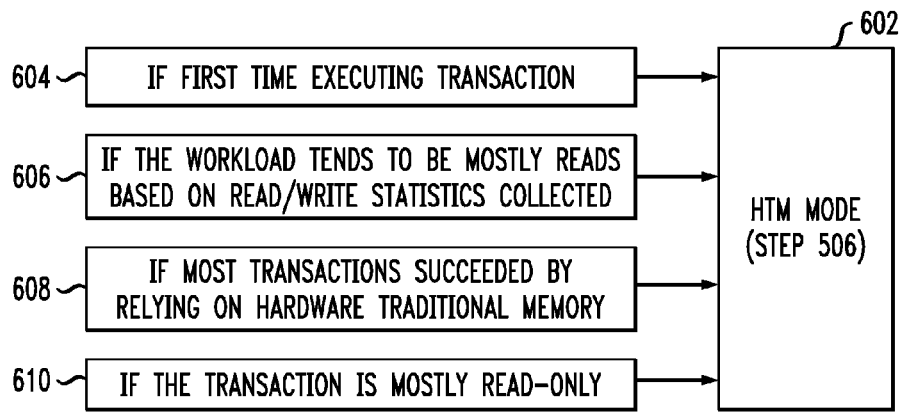
FIG. 6 shows factors leading to a hardware transactional memory mode in the process of FIG. 5.

FIG. 6 shows factors that can lead to a program/thread entering HTM mode (step 602) at step 506 in FIG. 5. These factors include, but are not limited to:

604 HTM mode: if it is the first time executing the transaction; 606 HTM mode: if the workload tends to be mostly read, based on read/write statistics collected (runtime statistics collection described in FIGS. 3 and 4), i.e., workload exceeds a pre-determined threshold of reads, for example, one or more individual transactions consist of 80% or 90% read accesses;

608 HTM mode: if most transactions have succeeded by relying on hardware traditional memory, i.e., workload exceeds a pre-determined threshold of successes in HTM mode; and

610 HTM mode: if the transactions are mostly read-only, i.e., workloads in which a majority of the transactions are 100% read accesses.

Note that under locking mode, the transaction is no longer to be executed in HTM mode and none of the HTM constraint applies.

Figure 7:
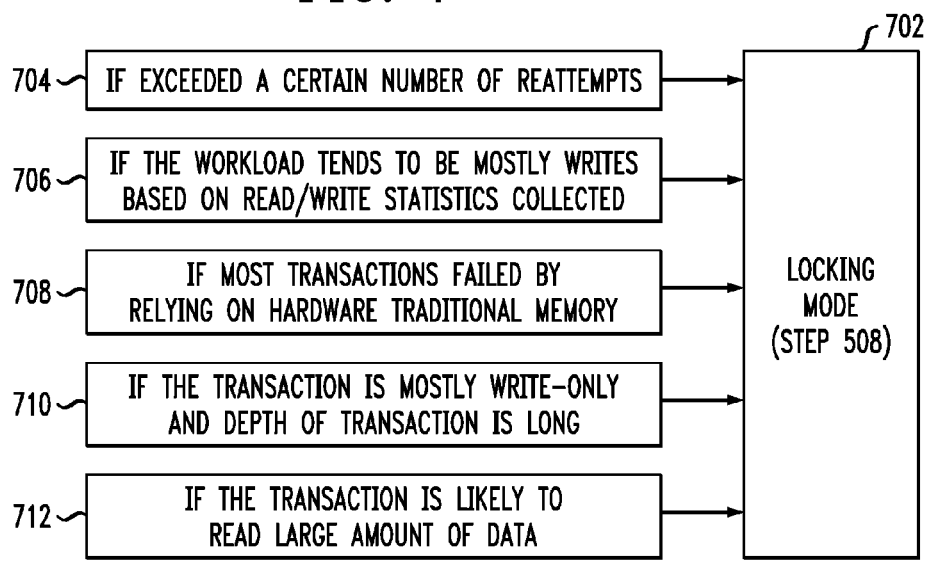
FIG. 7 shows factors leading to a locking mode in the process of FIG. 5.

FIG. 7 shows factors that can lead to the program/thread entering locking mode (step 702) at step 508 in FIG. 5. These factors include, but are not limited to:

704 Locking mode: if a pre-defined number of reattempts has been exceeded;

706 Locking mode: if the workload tends to be mostly-write, based on read/write statistics collected, i.e., workload exceeds a pre-determined threshold of writes, for example, one or more individual transactions consist of 80% or 90% read accesses;

708 Locking mode: if most transaction have failed by relying on hardware traditional memory, i.e., workload exceeds a pre-determined threshold of failures in HTM mode;

710 Locking mode: if the transaction is mostly write-only and depth of transaction is long (the transaction consists of many operations); and

712 Locking mode: if the transaction is likely to read large amount of data, i.e., the size of the data that is being accessed is larger than the size of the available transactional memory, for example, the amount of data to be read exceeds one megabyte of data.

Figure 8:
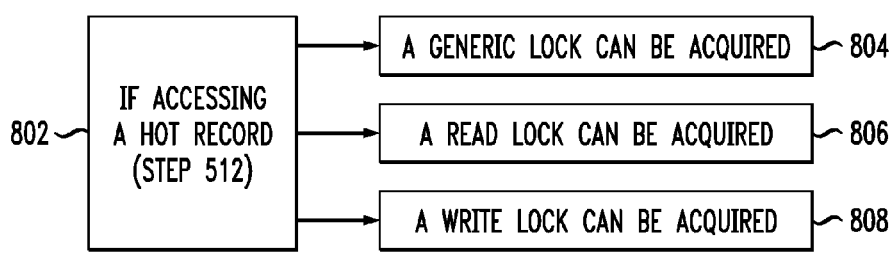
FIG. 8 shows additional steps after accessing a hot record during the process of FIG. 5.

FIG. 8 shows the locks that may be required if a hot record is accessed at step 512 in FIG. 5. At step 802, if a hot record is accessed in HTM mode, the following non-limiting examples of locks may be acquired:

804: a generic lock can be acquired;

806: a read lock can be acquired if the transaction is only interested in reading the record; and

808: a write lock can be acquired if the transaction expects to modify the record.

It should be noted that the above-described embodiments of the invention are presented for purposes of illustration only. Many variations and other alternative embodiments may be used. For example, data structures that are being accessed by more threads and/or users may also require concurrency protection in the form of either software concurrency mechanism (e.g., locking) and/or HTM. Each time a set of item(s) (e.g., records or data) in the hashtable is being updated as part of a transaction, the program or thread can enter the transactional region (e.g., HTM BEGIN), make changes, and exit the transactional region (e.g., HTM END). As such, techniques described herein, which provide for dynamically and adaptively switching between a HTM mode and locking mode, can be used to improve the performance of data structures, such as hash tables.

Embodiments of the present invention may be a system, a method, and/or a computer program product. The computer program product may include a computer readable storage medium (or media) having computer readable program instructions thereon for causing a processor to carry out aspects of the present invention.

Figure 9:
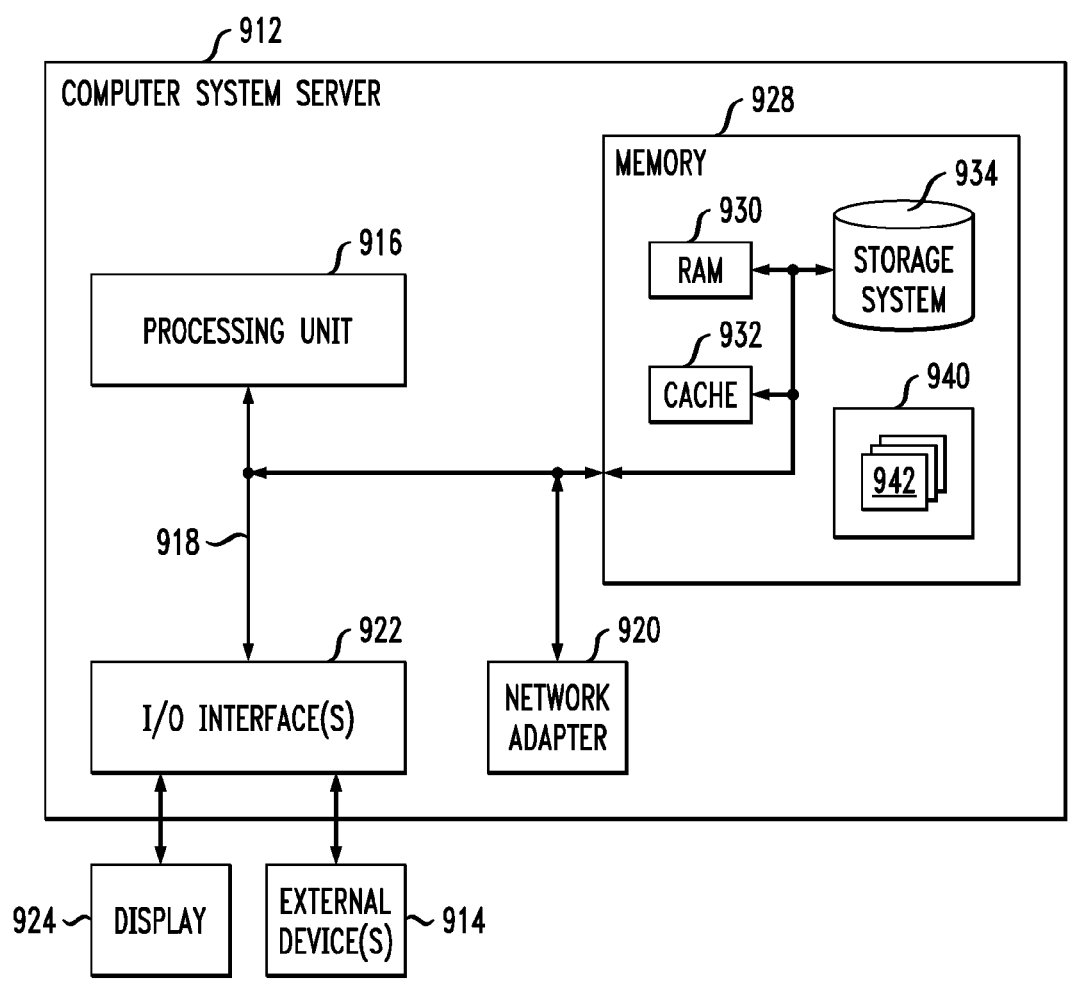
FIG. 9 shows a computer system in accordance with which one or more components, steps or techniques of the invention may be implemented according to an embodiment of the invention.

Accordingly, the architecture shown in FIG. 9 may be used to implement the various components/steps shown and described above in the context of FIGS. 1-8.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 9, a schematic of an example of a cloud computing node is shown. Cloud computing node 910 is only one example of a suitable cloud computing node and is not intended to suggest any limitation as to the scope of use or functionality of embodiments of the invention described herein. Regardless, cloud computing node 910 is capable of being implemented and/or performing any of the functionality set forth hereinabove.

One or more embodiments can make use of software running on a general-purpose computer or workstation. In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Figure 10:
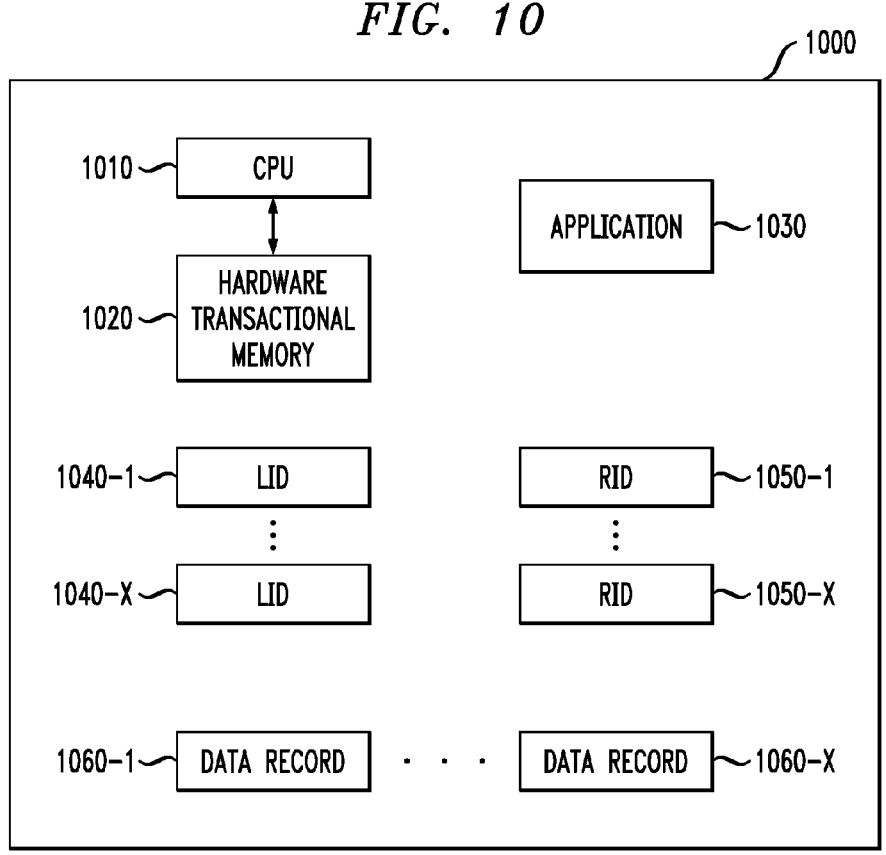
FIG. 10 shows an exemplary transactional memory system, according to an embodiment of the invention.

FIG. 10 illustrates a block diagram of an exemplary transactional memory system, in accordance with an embodiment of the invention. The transactional memory system 1000 may be a computing device of FIG. 9 that includes one or more central processing units (CPU) 1010, one or more hardware transactional memories (HTMs) 1020 (e.g., HTM 100 of FIG. 1), one or more applications 1030, one or more LIDs 1040-1 . . . 1040-X referencing one or more RIDs 1050-1 . . . 1050-X pointing to one or more stored data records 1060-1 . . . 1060-X, all of which may be stored, for example, on a computer readable storage medium, such as computer readable storage medium (media) and/or RAM(s) of FIG. 9.

In various embodiments, the one or more CPUs 1010 may be transactional memory enabled which may allow application 1030 to define specified code regions (also referred to as "transactional regions" or just "transactions") that are executed transactionally by a computing device. If the transactional execution completes successfully, then all memory operations performed within the transactional region will appear to have occurred instantaneously when viewed from other CPUs 1010. The CPU 1010 makes the memory operations of the executed transaction, performed within the transactional region, visible to other CPUs 1010 only when a successful commit occurs, i.e., when the transaction successfully completes execution. In various embodiments, CPU 1010 may support transactional memory architectural extensions that support program instructions within a transactional region to both suspend the transaction and to resume the suspended transaction. The CPU 1010 may discontinue loading accessed data into HTM 1020 between the suspend instruction and the subsequent resume instruction. CPU 1010 may resume loading accessed data in HTM 1020 following the resume instruction until another suspend instruction is encountered in the transactional region or the transactional region ends.

In various embodiments, HTM 1020 may include read and write sets for transactions. The transactional memory system 1000 may track data stores and assemble a write-set for the transaction, the actual write-set data may be buffered in HTM 1020 until the end of the transaction. When the transaction successfully commits its data, all the stores in the write-set become globally visible in an atomic fashion, typically by writing the buffered data to a cache. Alternatively, if the transaction aborts, then the buffered stores must be discarded, without modifying actual memory locations of the data. HTM 1020 may track data reads by creating a read-set in HTM 1020. A successful transaction may simply write all the reads belonging to a read-set, to the register file. Transactional memory systems may ease multi-threaded programming by guaranteeing that transactional regions execute atomically and in isolation.

In various embodiments, application 1030 may be a multi-threaded or multi-version application capable of running a plurality of simultaneous instances or users on the one or more CPUs 1010, each instance or user sharing common data. Various embodiments of application 1030 may control concurrency to shared data with data versioning, transactional regions, 2V-Indirection or multi-version-Indirection mapping, locking, or any combination of the above.

Figure 11:
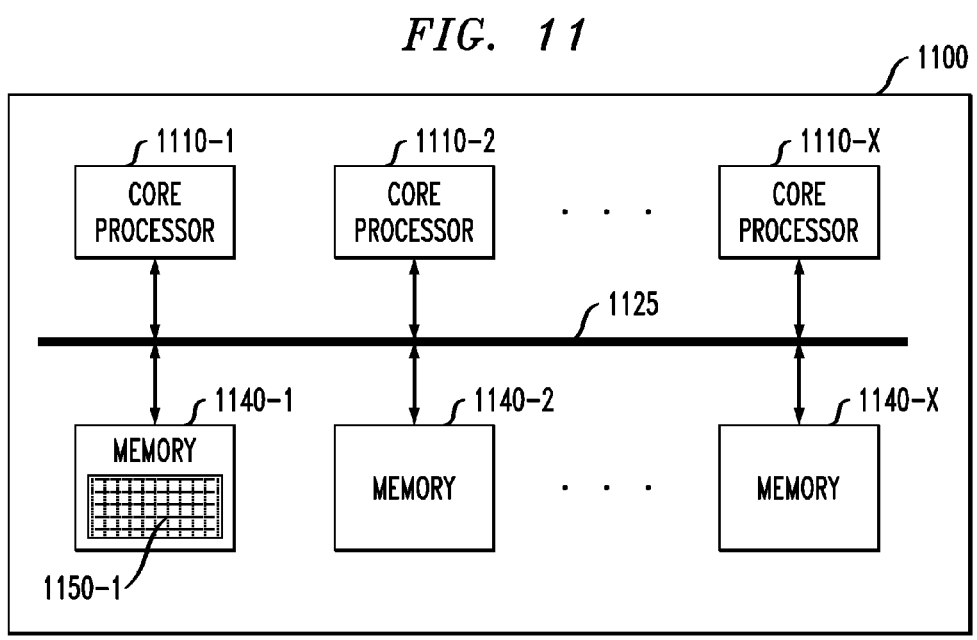
FIG. 11 shows a multi-core processor integrated circuit with which embodiments of the invention may be implemented.

FIG. 11 shows an exemplary multi-core processor integrated circuit 1100 which may be used in implementing embodiments of the invention. The multi-core processor 1100 includes one or more core processors 1110-1 . . . 1110-X and one or more memories 1140-1 . . . 1140-X. Bus 1125 enables communication between each of core processors 1110-1 . . . 1110-X and memories 1140-1 . . . 1140-X. One or more of the memories 1140-1 . . . 1140-X may include a hardware transactional memory 1150-1 (e.g., HTM 100 of FIG. 1; HTM 1020 of FIG. 10) for implementing adaptive concurrency control methods described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus, comprising:
a memory; and
a processor operatively coupled to the memory and configured to:
collect runtime statistics related to data transaction processing in a concurrent system, wherein the collected runtime statistics comprise at least one metric indicative of a number of accesses made to shared data in a given time period;
receive a given request to access the shared data in the concurrent system; and
adaptively determine, based on the collected runtime statistics, a number of reattempts the given request can make to access the shared data prior to access control being switched from a hardware transactional memory to a locking mechanism, wherein the number of reattempts is adaptively modified when the at least one metric indicative of the number of accesses is above at least a predetermined threshold.

2. The apparatus of claim 1, wherein the at least one metric comprises a metric indicative of a number of read accesses made to the shared data in a given time period.

3. The apparatus of claim 2, wherein the at least one metric comprises a metric indicative of the number of read accesses made to the shared data in the given time period divided by a total number of accesses made to the shared data in the given time period.

4. The apparatus of claim 2, wherein the number of reattempts adaptively increases when the at least one metric indicative of the number of read accesses is above the predetermined threshold.

5. The apparatus of claim 1, wherein the at least one metric comprises a metric indicative of a number of write accesses made to the shared data in a given time period.

6. The apparatus of claim 5, wherein the at least one metric comprises a metric indicative of the number of write accesses made to the shared data in the given time period divided by a total number of accesses made to the shared data in the given time period.

7. The apparatus of claim 5, wherein the number of reattempts adaptively decreases when the at least one metric indicative of a number of write accesses is above the predetermined threshold.

8. The apparatus of claim 1, wherein the at least one metric comprises a metric indicative of a total number of reattempts made to access the shared data.

9. The apparatus of claim 1, wherein the at least one metric comprises a metric indicative of a number of operations associated with the given request.

10. The apparatus of claim 9, wherein the number of reattempts adaptively decreases as the number of operations associated with the given request increases.

11. An article of manufacture comprising a non-transitory computer readable storage medium for storing computer readable program code, which, when executed, causes a computer to:
collect runtime statistics related to data transaction processing in a concurrent system, wherein the collected runtime statistics comprise at least one metric indicative of a number of accesses made to shared data in a given time period;
receive a given request to access the shared data in the concurrent system; and adaptively determine, based on the collected runtime statistics, a number of reattempts the given request can make to access the shared data prior to access control being switched from a hardware transactional memory to a locking mechanism, wherein the number of reattempts is adaptively modified when the at least one metric indicative of the number of accesses is above at least a predetermined threshold.

12. An apparatus comprising:

a memory; and a processor operatively coupled to the memory and configured to:

collect runtime statistics related to data transaction processing in a concurrent system, wherein the collected runtime statistics comprise a first metric indicative of a number of successful reattempts made to access shared data in a given time period and a second metric indicative of a number of failed reattempts made to access the shared data in the given time period;

receive a given request to access the shared data in the concurrent system; and adaptively determine, based on the collected runtime statistics, a number of reattempts the given request can make to access the shared data prior to access control being switched from a hardware transactional memory to a locking mechanism, wherein the number of reattempts is adaptively modified based on a comparison of the first metric to the second metric.

13. The apparatus of claim 12, wherein the first metric is a success ratio comprising the number of successful reattempts made to access the shared data in the given time period divided by a total number of reattempts made to access the shared data in the given time period.

14. The apparatus of claim 12, wherein the second metric is a failure ratio comprising the number of failed reattempts made to access the shared data in the given time period divided by a total number of reattempts made to access the shared data in the given time period.

15. The apparatus of claim 14, wherein the number of reattempts adaptively increases when the success ratio is greater than the failure ratio.

16. The apparatus of claim 14, wherein the number of reattempts adaptively decreases when the success ratio is less than the failure ratio.

17. An apparatus comprising:

a memory; and a processor operatively coupled to the memory and configured to:

collect runtime statistics related to data transaction processing in a concurrent system, the concurrent system comprising hardware transactional memory and a locking mechanism, wherein the collected statistics comprise at least one metric indicative of an amount of data associated with a given request to access shared data in the concurrent system; and utilize the locking mechanism when the amount of data associated with the given request is above at least a predefined threshold.

18. The apparatus of claim 17, wherein the predefined threshold is a size of available transactional memory.

19. An article of manufacture comprising a non-transitory computer readable storage medium for storing computer readable program code, which, when executed, causes a computer to:

collect runtime statistics related to data transaction processing in a concurrent system, wherein the collected runtime statistics comprise a first metric indicative of a number of successful reattempts made to access shared data in a given time period and a second metric indicative of a number of failed reattempts made to access the shared data in the given time period;

receive a given request to access the shared data in the concurrent system; and adaptively determine, based on the collected runtime statistics, a number of reattempts the given request can make to access the shared data prior to access control being switched from a hardware transactional memory to a locking mechanism;

wherein the number of reattempts is adaptively modified based on a comparison of the first metric to the second metric.

20. An article of manufacture comprising a non-transitory computer readable storage medium for storing computer readable program code, which, when executed, causes a computer to:

collect runtime statistics related to data transaction processing in a concurrent system, the concurrent system comprising hardware transactional memory and a locking mechanism, wherein the collected statistics comprise the amount of data associated with the given request; and utilize the locking mechanism when the amount of data associated with the given request is above at least a predefined threshold.

* * * * *